United States Patent [19]
Hirota et al.

[11] Patent Number: 5,974,791
[45] Date of Patent: Nov. 2, 1999

[54] EXHAUST GAS PURIFICATION DEVICE FOR AN INTERNAL COMBUSTION ENGINE

[75] Inventors: Shinya Hirota, Susono; Toshiaki Tanaka, Numazu, both of Japan

[73] Assignee: Toyota Jidosha Kabushiki Kaisha, Toyota, Japan

[21] Appl. No.: 09/028,916

[22] Filed: Feb. 24, 1998

[30] Foreign Application Priority Data

Mar. 4, 1997 [JP] Japan ................................. 9-048932
Feb. 17, 1998 [JP] Japan ................................. 10-035068

[51] Int. Cl.⁶ ........................................................ F01N 3/00
[52] U.S. Cl. ............................... 60/276; 60/286; 60/289; 60/301; 60/303
[58] Field of Search .............................. 60/286, 276, 289, 60/297, 300, 301, 303, 307, 311, 288; 423/235, 244.01, 244.06, 244.09, 244.1

[56] References Cited

U.S. PATENT DOCUMENTS

| | | | |
|---|---|---|---|
| 5,195,317 | 3/1993 | Nobue et al. | 60/275 |
| 5,591,417 | 1/1997 | Buchanan et al. | 423/244.09 |
| 5,687,565 | 11/1997 | Modica et al. | 60/274 |
| 5,746,989 | 5/1998 | Murachi et al. | |

FOREIGN PATENT DOCUMENTS

| | | |
|---|---|---|
| A 6-88518 | 3/1994 | Japan . |
| 6-200737 | 7/1994 | Japan . |
| 6-272541 | 9/1994 | Japan . |

*Primary Examiner*—Thomas E. Denion
*Assistant Examiner*—Binh Tran
*Attorney, Agent, or Firm*—Oliff & Berridge, PLC

[57] ABSTRACT

In an exhaust gas purification device, an exhaust gas passage of a diesel engine diverges into two branch pipes and a particulate filter (DPF) is disposed in each of the branch pipes. The DPF uses a metallic substrate and $NO_x$ absorbent is attached to the wall of the paths in the DPF. Therefore, the DPF act as both a normal particulate filter and a $NO_x$ absorbent. During the operation of the engine, $SO_x$, as well as $NO_x$, in the exhaust gas is absorbed in the $NO_x$ absorbent in the DPF. An electronic control unit (ECU) monitors the amount of $SO_x$ absorbed in the DPF during the operation and, when the amount of $SO_x$ absorbed in one DPF increases, switches the exhaust gas flow to the other DPF. The ECU further performs the $SO_x$ recovery operation to release the absorbed $SO_x$ from the DPF. After completing the $SO_x$ recovery operation, the ECU performs the regenerating operation of the DPF in which the particulate matter trapped in the DPF is burned. Since $SO_x$ in DPF is already released by the previous $SO_x$ recovery operation when the regenerating operation of the DPF is performed, the growth of sulfate particle in the DPF does not occur even if the DPF is exposed to a high temperature lean air-fuel ratio atmosphere of the regenerating operation.

6 Claims, 10 Drawing Sheets

EXHAUST GAS PURIFICATION DEVICE FOR AN INTERNAL COMBUSTION ENGINE

BACKGROUND OF THE INVENTION

1. Field of the Invention

The present invention relates to an exhaust gas purification device for an internal combustion engine. More specifically, the present invention relates to an exhaust gas purification device includes a $NO_x$ absorbent for removing $NO_x$ in the exhaust gas of an internal combustion engine.

2. Description of the Related Art

An exhaust gas purification device utilizing a $NO_x$ absorbent in order to remove $NO_x$ in the exhaust gas of an internal combustion engine is known in the art. The $NO_x$ absorbent, for example, contains precious metals such as platinum (Pt), and at least one substance selected, for example, from alkaline metals such as potassium (K), sodium (Na), lithium (Li), and cesium (Cs), alkaline earth metals such as barium (Ba) and calcium (Ca), and rare earth elements such as lanthanum (La) and yttrium (Y). The $NO_x$ absorbent absorbs $NO_x$ in the exhaust gas when the air-fuel ratio of the exhaust gas flowing through the $NO_x$ absorbent is lean, and releases the absorbed $NO_x$ when the oxygen concentration in the exhaust gas drops and, at the same time, reduces the absorbed $NO_x$ to $N_2$. Further, in this specification, the term "air-fuel ratio of the exhaust gas" means a ratio of the air and the fuel, which are supplied to the engine or exhaust passages upstream of the $NO_x$ absorbent. Therefore, when no air and fuel is supplied in the exhaust passages upstream of the $NO_x$ absorbent 5, the air-fuel ratio of the exhaust gas becomes the same as the operating air-fuel ratio of the engine (i.e., the air-fuel ratio of the air-fuel mixture supplied to combustion chambers of the engine).

The mechanism of the absorbing and releasing operation of $NO_x$ by the $NO_x$ absorbent will be explained later in detail. However, the $NO_x$ absorbent also absorbs $SO_x$ by a mechanism the same as the absorbing mechanism of $NO_x$ when $SO_x$ is contained in the exhaust gas (in this specification, sulfur oxide such as SO2 and SO3 are referred to as $SO_x$ in general). However, since $SO_x$ absorbed in the $NO_x$ absorbent forms a stable sulfate, it is relatively difficult to make the $NO_x$ absorbent release the absorbed $SO_x$. Therefore, the absorbed $SO_x$ tends to accumulate in the $NO_x$ absorbent. When the amount of $SO_x$ absorbed in the $NO_x$ absorbent increases, the capacity of $NO_x$ absorbent for absorbing $NO_x$ becomes low. This causes a deterioration of the ability of $NO_x$ absorbent for purifying $NO_x$ in the exhaust gas (hereinafter, this deterioration caused by the accumulation of $SO_x$ in the $NO_x$ absorbent is referred to as "a sulfur deterioration" or "an S-deterioration"). Particularly, in the case where a diesel engine is used, the S-deterioration becomes a problem since diesel fuel used for a diesel engine contains a relatively large amount of sulfur.

It is also known that $SO_x$ absorbed in the $NO_x$ absorbent can be released from the $NO_x$ absorbent by a mechanism the same as the mechanism for releasing $NO_x$. However, it is difficult to release $SO_x$ from the $NO_x$ absorbent in the same conditions as the $NO_x$ releasing operation. Since $SO_x$ absorbed in the $NO_x$ absorbent forms a stable sulfate, it is required to raise the temperature of the $NO_x$ absorbent to a temperature higher (for example, about 500° C.) than the temperature during the normal $NO_x$ releasing operation of the $NO_x$ absorbent (for example, about 250° C.) under a reducing atmosphere (i.e., in a rich air-fuel ratio exhaust gas). This kind of $SO_x$ releasing operation for recovering the $NO_x$ absorbing capacity of the $NO_x$ absorbent from the S-deterioration is hereinafter referred to as "a $SO_x$ recovery operation" or "a S-recovery operation".

Japanese Unexamined Patent Publication (Kokai) No. 6-88518 discloses an exhaust gas purification device which performs the $SO_x$ recovery operation of a $NO_x$ absorbent. The device in the '518 publication includes a $NO_x$ absorbent disposed in the exhaust gas passage of an internal combustion engine for removing $NO_x$ from the exhaust gas. The device in the '518 publication performs the $SO_x$ recovery operation by controlling the air-fuel ratio of the engine to a rich air-fuel ratio intermittently (or continuously) when the engine is operated at a lean air-fuel ratio and at a high exhaust gas temperature.

However, since the device in the '518 publication starts the $SO_x$ recovery operation after the exhaust gas temperature becomes high when the air-fuel ratio of the exhaust gas is lean, a high temperature exhaust gas of a lean air-fuel ratio always flows into the $NO_x$ absorbent before the $SO_x$ recovery operation starts. As explained before, the $NO_x$ absorbent holds the absorbed $SO_x$ therein in a form of relatively stable sulfate particles. When the sulfate particles are exposed to a lean air-fuel ratio atmosphere at a high temperature, growth of the particles due to sintering occurs and the sizes of the sulfate particles become larger. When the sizes of the sulfate particles become large, it is difficult to decompose the sulfate particles by the $SO_x$ recovery operation since the stability of the sulfate particles largely increases. Therefore, if the $NO_x$ absorbent is exposed to a lean air-fuel ratio atmosphere at a high temperature always before the start of the $SO_x$ recovery operation as in the device of the '518 publication, the growth of the sulfate particles occurs and, thereby, S-deterioration of the $NO_x$ absorbent cannot be recovered by the $SO_x$ recovery operation due to the increased stability of the sulfate particles.

Further, if a particulate filter which traps particulate matter (for example, particulate in the exhaust gas of a diesel engine) is provided in the exhaust gas passage upstream of the $NO_x$ absorbent, it becomes necessary to burn the particulate matter trapped in the particulate filter periodically. Normally, the burning operation of the particulate matter is performed in a lean air-fuel ratio atmosphere. (Hereinafter, this burning operation of the particulate matter in the particulate filter is referred to as "a regenerating operation of the particulate filter".) Therefore, when the regenerating operation of the particulate filter upstream of the $NO_x$ absorbent is performed, high temperature exhaust gas of a lean air-fuel ratio continuously flows into the $NO_x$ absorbent and, thereby, the growth of the sulfate particles in the $NO_x$ absorbent occurs. This causes the problem of the difficulty in the $SO_x$ recovery operation of the $NO_x$ absorbent as explained above.

A similar problem occurs when a three-way catalyst or an oxidizing catalyst is provided in the exhaust gas passage upstream of the $NO_x$ absorbent in order to remove (oxidize) specific components in the exhaust gas such as HC and CO, or SOF (soluble organic fraction).

The exhaust gas of an internal combustion engine, especially, the exhaust gas of a diesel engine contains SOF (soluble organic fraction) composed of hydrocarbons such as unburned fuel, unburned lubricating oil, etc.

During the engine operation, a portion of the SOF in the exhaust gas is oxidized by the oxidizing catalyst or the three-way catalyst, and the rest of the SOF attaches to the surface of the catalyst. When the amount of SOF attached to the surface of the catalyst increases, the catalytic components are covered by SOF and the ability of the catalyst is deteriorated. This type of the deterioration of the oxidizing catalyst or the three-way catalyst is hereinafter referred to as "the SOF-deterioration of the catalyst". When the amount of SOF in the exhaust gas is large, therefore, it is necessary to burn the SOF attached to the surface of the catalyst periodically in order to prevent the SOF-deterioration. The burning operation of the SOF attached to the catalyst (hereinafter referred to as "a SOF recovery operation of the catalyst") is normally performed in a lean air-fuel ratio atmosphere. Therefore, when the SOF recovery operation of the catalyst is performed, a high temperature exhaust gas of a lean air-fuel ratio continuously flows into the downstream $NO_x$ absorbent. This also causes a problem in the $SO_x$ recovery operation of the $NO_x$ absorbent.

SUMMARY OF THE INVENTION

In view of the problems in the related art as set forth above, the object of the present invention is to provide an exhaust gas purification device utilizing a $NO_x$ absorbent which is capable of facilitating the $SO_x$ recovery operation by preventing the growth of the sulfate particles in the $NO_x$ absorbent.

This object is achieved by an exhaust gas purification device for an engine which comprises a $NO_x$ absorbent disposed in an exhaust gas passage of an internal combustion engine, wherein the $NO_x$ absorbent absorbs $NO_x$ in the exhaust gas of the engine when the air-fuel ratio of the exhaust gas is a lean air-fuel ratio and releases the absorbed $NO_x$ when the oxygen concentration in the exhaust gas is lowered, and wherein the $NO_x$ absorbent absorbs $SO_x$ in the exhaust gas when the air-fuel ratio of the exhaust gas is a lean air-fuel ratio and releases the absorbed $SO_x$ when the oxygen concentration in the exhaust gas is lowered and when the temperature of the $NO_x$ absorbent is higher than a $SO_x$ releasing temperature, $SO_x$ releasing means for raising the temperature of the $NO_x$ absorbent to a temperature higher than the $SO_x$ releasing temperature and for lowering the oxygen concentration of the exhaust gas flowing into the $NO_x$ absorbent to, thereby, release the absorbed $SO_x$ from the $NO_x$ absorbent, and $SO_x$ control means for controlling the amount of $SO_x$ absorbed in the $NO_x$ absorbent by controlling the $SO_x$ releasing means in such a manner that, when it is expected that the temperature of the $NO_x$ absorbent will increase to a first predetermined temperature when the air-fuel ratio of the exhaust gas is lean, substantially all of the absorbed $SO_x$ is released from the $NO_x$ absorbent by the $SO_x$ releasing means before the temperature of the $NO_x$ absorbent reaches the first predetermined temperature.

According to the present invention, an $SO_x$ control means activates the $SO_x$ releasing means in order to release the absorbed $SO_x$ from the $NO_x$ absorbent when the temperature of the $NO_x$ absorbent increases and is expected to reach the first predetermined temperature in a lean air-fuel ratio atmosphere. This first predetermined temperature is, for example, the lowest temperature at which the growth of sulfate particles occurs in a lean air-fuel ratio exhaust gas.

Therefore, all the absorbed $SO_x$ is released from the $NO_x$ absorbent before the temperature of the $NO_x$ absorbent becomes higher than the first predetermined temperature. Namely, when the temperature of the $NO_x$ absorbent reaches to the first predetermined temperature in a lean air-fuel ratio exhaust gas, i.e., when the $NO_x$ absorbent is exposed to a high temperature in a lean air-fuel ratio atmosphere, substantially no sulfate particle is held in the $NO_x$ absorbent. Therefore, the growth of the sulfate particles does not occur in the $NO_x$ absorbent even if the $NO_x$ absorbent is exposed to a high temperature in a lean air-fuel ratio atmosphere. Since the growth of the sulfate particles does not occur in the present invention, the absorbed $SO_x$ is easily released from the $NO_x$ absorbent by the $SO_x$ recovery operation.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Figure 1:
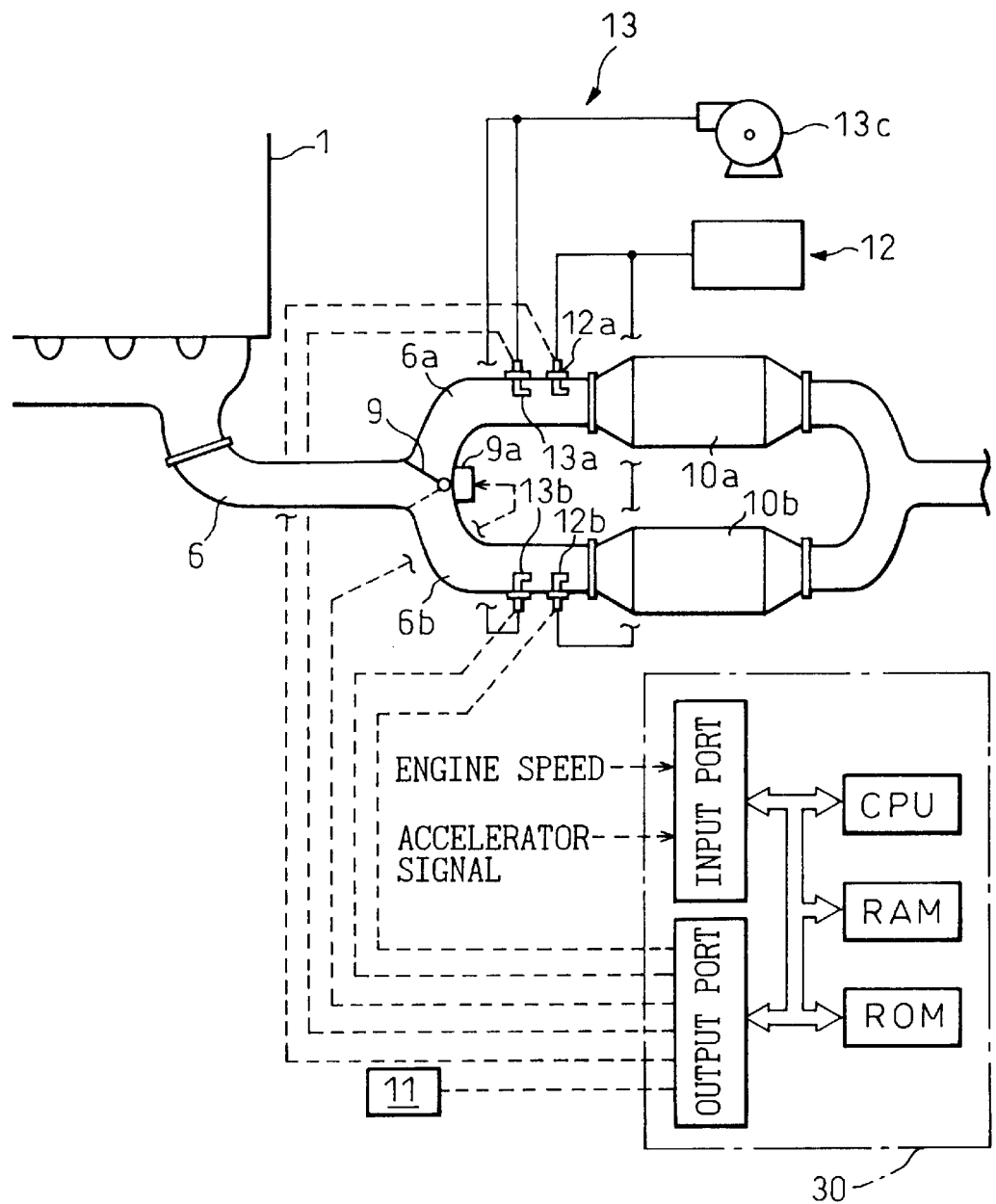
FIG. 1 schematically illustrates an embodiment of the exhaust gas purification device according to the present invention when it is applied to a diesel engine for an automobile.

FIG. 1 is a drawing schematically illustrating the general configuration of an embodiment of the present invention when it is applied to a diesel engine for an automobile.

In FIG. 1, reference numeral 6 designates an exhaust gas passage of the diesel engine 1, 6a and 6b designate branch exhaust gas passages diverged from the exhaust gas passage 6. A particulate filter (DPF) 10a and 10b which is provided with the function of a $NO_x$ absorbent is disposed on each branch passage 6a and 6b. The DPF 10a and 10b in this embodiment, are made of, for example, a sintered metal or a metallic foam filter having numerous fine anfractuous exhaust gas paths therein. When the exhaust gas flows through the anfractuous paths in the DPF 10a and 10b, the particulate matter contained in the exhaust gas impinges on the wall surfaces of the paths and attaches thereto. Namely, the DPF 10a and 10b in this embodiment are impinging trap type particulate filters.

Further, in this embodiment, the $NO_x$ absorbent is attached to the wall surface of the exhaust gas paths in the DPF 10a and 10b in order to provide the function as the $NO_x$ absorbent to the DPF 10a and 10b. Therefore, in this embodiment, the upstream portions of the DPF 10a and 10b mainly act as particulate filters for trapping the particulate matter in the exhaust gas, and the downstream portions of the DPF 10a and 10b mainly act as $NO_x$ absorbent for removing $NO_x$ in the exhaust gas.

Further, the bodies of the DPF 10a and 10b are connected to an electric power supply (not shown) via a relay 11 in such a manner that electricity can be supplied to the DPF 10a and 10b separately. As explained later, electricity is supplied to the DPF 10a and 10b separately during the $SO_x$ recovery operation and the regenerating operation in order to raise the temperature of the metallic bodies of the DPF 10a and 10b by the heat generated by the electric current flowing therethrough. Namely, the bodies of the DPF 10a and 10b act as electric heaters in this embodiment.

In FIG. 1, numeral 9 designates a switching valve, and 9a designates an appropriate actuator for operating the switching valve 9 such as solenoid actuator or a vacuum actuator.

In FIG. 1, a reducing agent supply unit 12 is provided for supplying reducing agent to the respective branch exhaust gas passages upstream of the DPF 10a and 10b. In this embodiment, since fuel for the engine 1 (diesel fuel) is used as the reducing agent, the reducing agent supply unit 12 is equipped with injection nozzles 12a and 12b which inject mists of fuel into the branch exhaust gas passages 6a and 6b upstream of the respective DPF 10a and 10b. The reducing agent supply unit 12 is used for lowering the oxygen concentration in the exhaust gas flowing into the DPF 10a and 10b during the $NO_x$ releasing operation and the $SO_x$ recovery operation of the DPF ($NO_x$ absorbents) 10a and 10b, as well as for the regenerating operation of the DPF 10a and 10b.

In this embodiment, a secondary air supply unit 13 for supplying secondary air to the respective branch exhaust gas passages 6a and 6b upstream of the DPF 10a and 10b is provided. The secondary air supply unit 13 includes a pressurized air source 13c such as an air pump or a pressurized air tank, and secondary air nozzles 13a and 13b disposed in the branch exhaust gas passage 6a and 6b. The secondary air supply unit 13 is used for supplying air for burning the particulate matter trapped in the DPF 10a and 10b during the regenerating operation of the DPF 10a and 10b.

Numeral 30 in FIG. 1 designates an electronic control unit (ECU) of the engine. The ECU 30 in this embodiment comprises, for example, a microcomputer of a known type which has a CPU, a RAM, a ROM, and input and output ports all interconnected by a bi-directional bus. The ECU 30 performs fundamental control of the engine such as fuel injection control of the engine 1. In addition to that, the ECU 30 in this embodiment controls the $NO_x$ releasing operation and $SO_x$ recovery operation, as well as the regenerating operation, of the DPF 10a and 10b. To perform these controls, various signals are fed to the input port of the ECU 30. These signals are, for example, an engine speed signal from an engine speed sensor disposed near the crankshaft (not shown) of the engine and an accelerator signal from an accelerator sensor disposed near an accelerator pedal (not shown) which represents the amount of depression of the accelerator pedal by the driver.

The output port of the ECU 30 is connected to, for example, the fuel injection valves of the engine, the actuator 9a of the intake shutter valve 9, the reducing agent supply nozzles 12a and 12b, the secondary air nozzles 13a and 13b and the relay 11 in order to control the operations of these elements.

Next, the $NO_x$ absorbent attached to the wall surfaces of the exhaust gas paths in the DPF 10a and 10b is explained.

The $NO_x$ absorbent in this embodiment comprises precious metals such as platinum (Pt) rhodium (Rh), and at least one substance selected from alkali metals such as potassium (K), sodium (Na), lithium (Li) and cesium (Cs); alkali-earth metals such as barium (Ba) and calcium (Ca); and rare-earth metals such as lanthanum (La) and yttrium (Y). The $NO_x$ absorbent absorbs $NO_x$ (nitrogen oxide) in the exhaust gas when the air-fuel ratio of the exhaust gas flowing through the DPF 10a and 10b is lean, and releases the absorbed $NO_x$ when the oxygen concentration of the exhaust gas flowing through the DPF 10a and 10b.

Though the mechanism of this absorbing and releasing operation of the $NO_x$ absorbent is not clear at present, it is thought that the absorbing and releasing operation uses the following mechanism. Though the following mechanism of the absorbing and releasing operation of the $NO_x$ absorbent is explained for the case where platinum Pt and barium Ba are used, as an example, it is thought that similar mechanisms also apply even if other precious metal, alkali metals, alkali earth metals, or rare earth metals are used.

Namely, when the concentration of $O_2$ in the exhaust gas increases, i.e., when the air-fuel ratio of the exhaust gas becomes lean (i.e. when the excess air ratio $\lambda$ is larger than 1.0), the oxygen $O_2$ in the exhaust gas is deposited on the surface of platinum Pt in the form of $O_2^-$ or $O^{2-}$. NO in the exhaust gas reacts with $O_2^-$ or $O^{2-}$ on the surface of the platinum Pt and becomes $NO_2$ by the reaction $2NO + O_2 \rightarrow 2NO_2$.

Then, $NO_2$ in the exhaust gas and the $NO_2$ produced on the platinum Pt are further oxidized on the surface of platinum Pt and absorbed into the $NO_x$ absorbent while bonding with the barium oxide BaO and diffusing in the absorbent in the form of nitric acid ions $NO_3^-$. Thus, $NO_x$ in the exhaust gas is absorbed by the $NO_x$ absorbent when the air-fuel ratio of the exhaust gas is lean.

On the other hand, when the oxygen concentration in the exhaust gas becomes low, i.e., when the air-fuel ratio of the exhaust gas becomes stoichiometric or rich ($\lambda \leq 1.0$), the production of $NO_2$ on the surface of the platinum Pt is lowered and the reaction proceeds in an inverse direction ($NO_3^- \rightarrow NO_2$), and thus nitric acid ions $NO_3^-$ in the absorbent are released in the form of $NO_2$ from the $NO_x$ absorbent.

In this case, if a reducing substance such as CO, or a substance such as HC and $CO_2$ exist in the exhaust gas, released $NO_x$ is reduced on the platinum Pt by these components. Namely, the $NO_x$ absorbent performs the absorbing and releasing operation of $NO_x$ in the exhaust gas in which $NO_x$ in the exhaust gas is absorbed by the $NO_x$ absorbent when the air-fuel ratio of the exhaust gas is lean and, when the air-fuel ratio of the exhaust gas becomes stoichiometric or rich, released from the $NO_x$ absorbent and reduced to $N_2$.

However, if sulfur oxide ($SO_x$) is contained in the exhaust gas, $SO_x$ in the exhaust gas is absorbed in the $NO_x$ absorbent when the air-fuel ratio of the exhaust gas is lean, by the same mechanism as the $NO_x$ absorbing operation. The absorbed $SO_x$ is held in the $NO_x$ absorbent in the form of particles of a sulfate such as $BaSO_4$. Generally, the sulfate formed in the $NO_x$ absorbent is a stable substance. Therefore, though the sulfate held in the $NO_x$ absorbent can be also released from the $NO_x$ absorbent by the same mechanism as the $NO_x$ releasing operation when the air-fuel ratio of the exhaust gas becomes rich, it is necessary to raise the temperature of $NO_x$ absorbent to a temperature higher than the same in the $NO_x$ releasing operation, in order to release $SO_x$ from the $NO_x$ absorbent. This means that $SO_x$ is not released from the $NO_x$ absorbent during the normal $NO_x$ releasing operation and tends to accumulate in the $NO_x$ absorbent. When the amount of $SO_x$ in the $NO_x$ absorbent increases, the amount of the absorbent in the $NO_x$ absorbent which contributes to the $NO_x$ absorption decreases accordingly. Therefore, when the amount of $SO_x$ absorbed in the $NO_x$ absorbent increases, the capacity of the $NO_x$ absorbent for absorbing $NO_x$ decreases, i.e., S-deterioration occurs.

Further, the sulfate particles held in the $NO_x$ absorbent easily grow to larger size particles when the particles are exposed to a high temperature in a lean air-fuel ratio atmosphere. Though $SO_x$ can be released from the $NO_x$ absorbent by the $SO_x$ recovery operation in which the temperature of the $NO_x$ absorbent is raised to a temperature higher than the $NO_x$ releasing operation in a rich air-fuel ratio atmosphere, once the growth of the sulfate particles occurs, the particles are not decomposed even if they are exposed to a high temperature in a rich air-fuel ratio atmosphere. Therefore, when the growth of the sulfate particles occurs, it is difficult to recover the original $NO_x$ absorbing capacity of the $NO_x$ absorbent.

When a particulate filter is disposed in the exhaust gas passage upstream of the $NO_x$ absorbent, such gas in this embodiment, usually a high temperature exhaust gas of a lean air-fuel ratio flows through the $NO_x$ absorbent during the regenerating operation of the particulate filter, and it becomes difficult to release $SO_x$ from the $NO_x$ absorbent by the $SO_x$ recovery operation due to the growth of the sulfate particles. In this embodiment, therefore, the $NO_x$ releasing operation of the $NO_x$ absorbent, the $SO_x$ recovery operation of the $NO_x$ absorbent and the regenerating operation of the DPF are performed in the manner explained hereinafter in order to prevent the growth of the sulfate particles in the $NO_x$ absorbent.

In this embodiment, the ECU 30 switches the switching valve 9 to a position where substantially all the exhaust gas of the engine 1 is directed to one of the DPF (for example, to the DPF 10*a*). Since a diesel engine is used in this embodiment, the air-fuel ratio of the exhaust gas during the normal operation of the engine 1 is considerably lean. Therefore, the DPF (10*a*) to which the exhaust gas is directed absorbs $NO_x$ in the exhaust gas by the $NO_x$ absorbent attached to the wall surface of the exhaust gas passage in the DPF, in addition to trapping the particulate matter in the exhaust gas. When the amount of $NO_x$ absorbed in the DPF (10*a*) increases, the ECU 30 switches the switching valve 9 to the other position in order to direct the exhaust gas of the engine to the other DPF (10*b*). Thus, substantially no exhaust gas flows through the DPF (10*a*), and the other DPF (10*b*) absorbs $NO_x$ and traps particulate matter in the exhaust gas.

In this condition, the ECU 30 supplies a reducing agent to the DPF (10*a*) from the corresponding nozzle (12*a*) of the reducing agent supply unit 12. Substances which generate components such as hydrogen $H_2$, hydrocarbon HC, and carbon monoxide CO can be used as the reducing agent. Therefore, reducing gases such as hydrogen gas or carbon monoxide gas, gaseous or liquid hydrocarbons such as propane, propylene or butane, and liquid fuels such as gasoline, diesel fuel or kerosene, etc., can be used as the reducing agent in the present invention. In this embodiment, fuel of the engine 1, i.e., diesel fuel is used as reducing agent in order to facilitate the storage and replenishment thereof.

When the reducing agent is supplied to the DPF, the reducing agent is oxidized on the surface of the platinum Pt in the $NO_x$ absorbent. This makes the air-fuel ratio of the exhaust gas rich, i.e., the oxygen concentration in the exhaust gas becomes low and HC and CO are generated by the oxidation of the reducing agent. Therefore, $NO_x$ absorbed in the $NO_x$ absorbent is released and reduced by HC and CO as explained before, i.e., the $NO_x$ releasing operation is performed.

Since the temperature of the exhaust gas from the diesel engine is relatively low, $SO_x$ absorbed in the $NO_x$ absorbent is not released from the $NO_x$ absorbent by the above-explained $NO_x$ releasing operation, and the amount of $SO_x$ absorbed in the $NO_x$ absorbent gradually increases. However, since the growth of the sulfate particles does not occur due to the low exhaust gas temperature in this condition, $SO_x$ absorbed in the $NO_x$ absorbent can be easily released by performing $SO_x$ recovery operation.

Therefore, in this embodiment, the ECU 30 performs the $SO_x$ recovery operation instead of the $NO_x$ releasing operation if the amount of $SO_x$ absorbed in the $NO_x$ absorbent becomes large. In the $SO_x$ recovery operation, similarly to the $NO_x$ releasing operation, the reducing agent is supplied to the DPF while stopping the exhaust gas flow. However, in the $SO_x$ recovery operation, the temperature of the DPF is further raised by closing the contacts of the relay 11. When the relay is closed, electricity is supplied to the body of the DPF and the whole body of the DPF is heated by electric current. Since the volume of the DPF body is relatively small, and since the electricity is supplied to the DPF when the exhaust gas flow does not exist, the temperature of the DPF rises to a temperature required for the $SO_x$ recovery operation (for example, about 500° C.) in a short time. When the reducing agent is supplied to the DPF, the $NO_x$ absorbent in the DPF is exposed to a high temperature in a rich air-fuel ratio atmosphere and, thereby, $SO_x$ absorbed in the $NO_x$ absorbent is released from the absorbent in the form of $SO_2$.

Further, in this embodiment, the ECU 30 performs the regenerating operation of the DPF immediately after the completion of the $SO_x$ recovery operation. Namely, after releasing all the $SO_x$ absorbed in the $NO_x$ absorbent, the ECU 30 supplies secondary air to the DPF from the secondary air supply unit 13. Since the temperature of the DPF is high immediately after the $SO_x$ recovery operation, the particulate matter trapped in the DPF burns when air (oxygen) is supplied to the DPF. In this condition, the amount of secondary air must be sufficient to supply oxygen for burning particulate matter in the DPF. In this condition, the $NO_x$ absorbent in the DPF is exposed to a high temperature in a lean air-fuel ratio atmosphere. However, since the regenerating operation of the DPF is performed always after the completion of the $SO_x$ recovery operation, substantially no $SO_x$ exists in the $NO_x$ absorbent when the regenerating operation is performed. Therefore, growth of the sulfate particles does not occur during the regenerating operation of the DPF.

Figure 2:
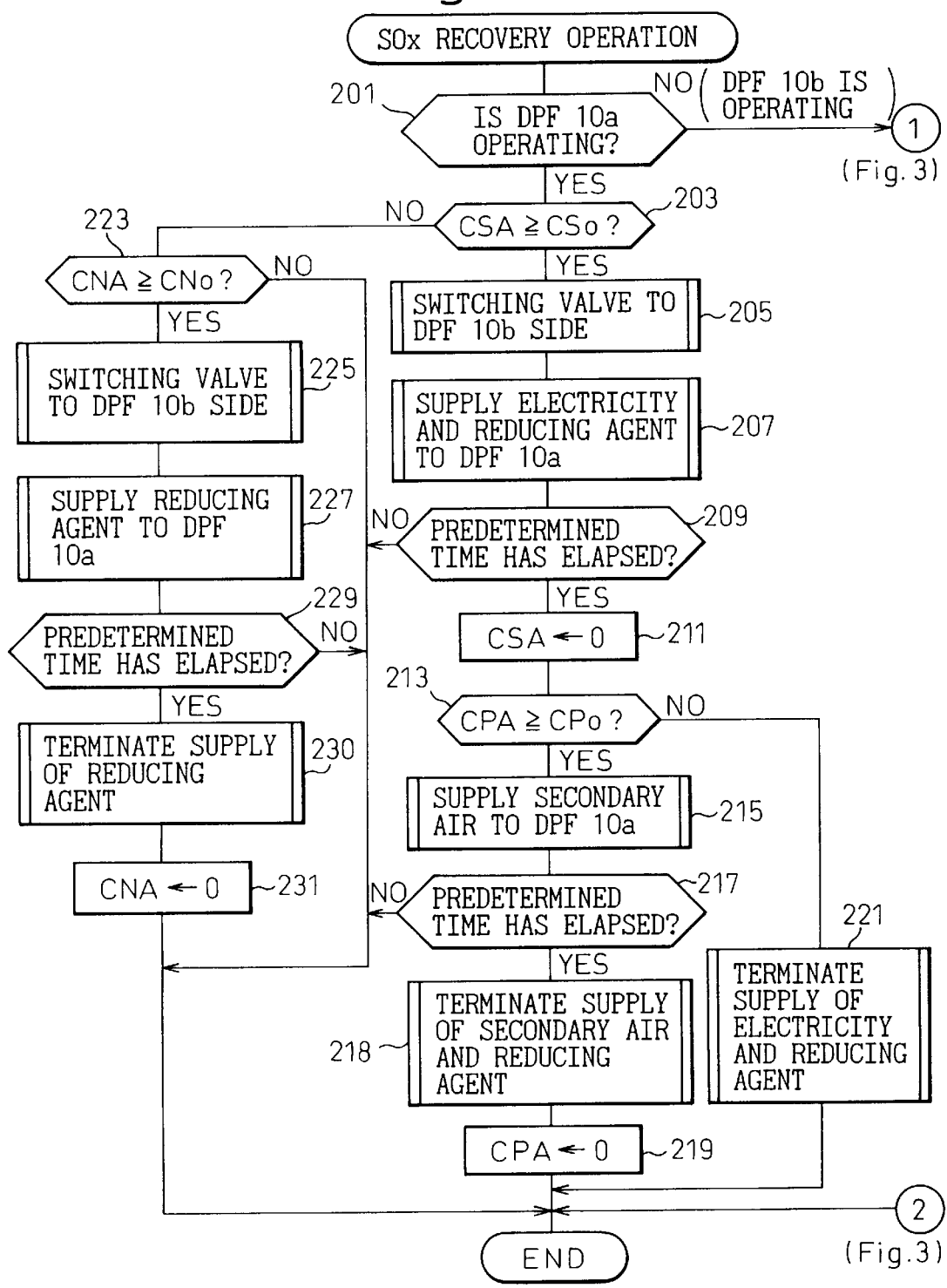
FIGS. 2 and 3 show a flowchart illustrating an embodiment of the $SO_x$ recovery operation of the device in FIG. 1.
Figure 3:
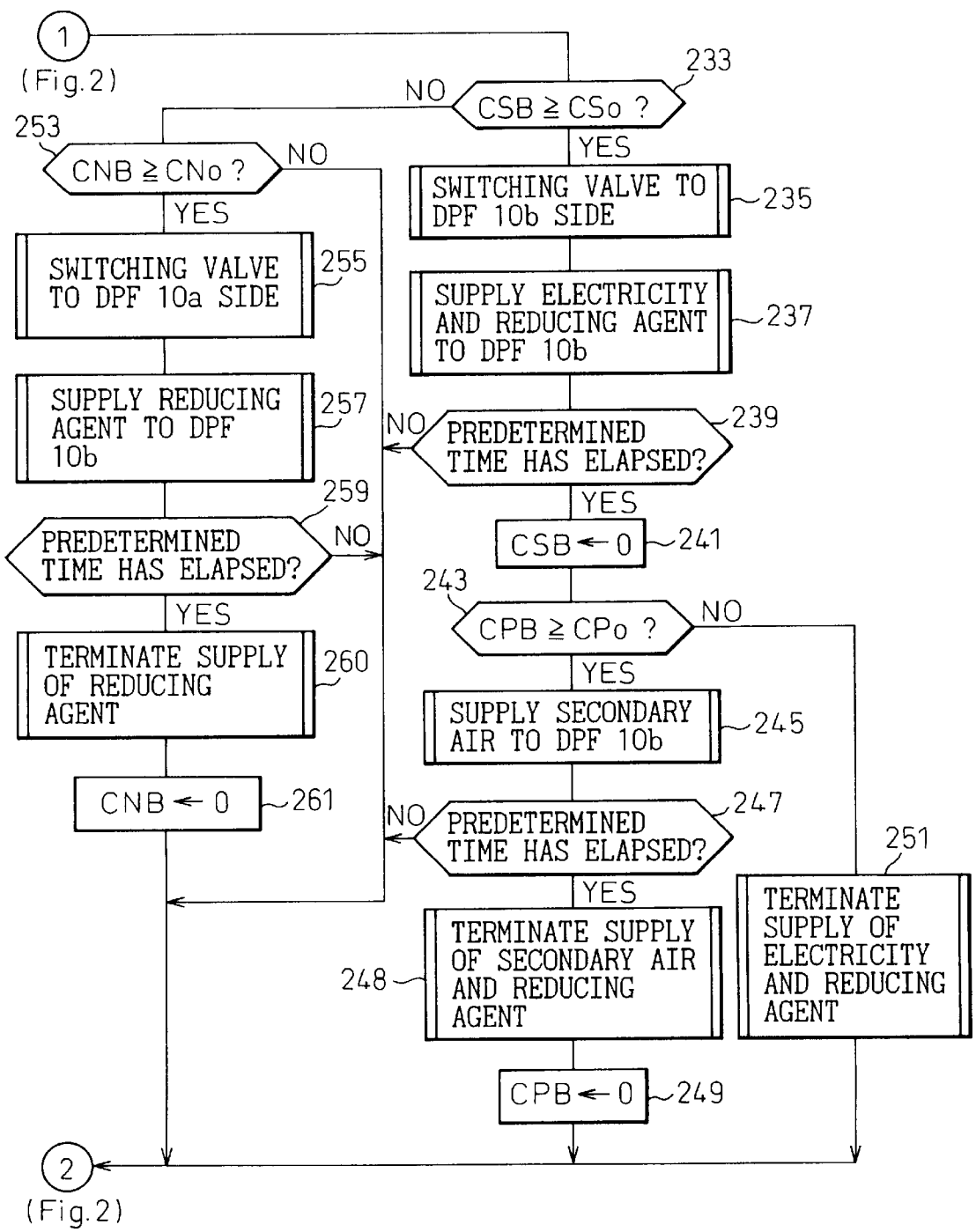

FIGS. 2 and 3 are a flowchart explaining the $SO_x$ recovery operation as explained above. This operation is performed by a routine executed by the ECU 30 at predetermined intervals.

When the operation starts, in FIG. 2, at step 201, the ECU 30 determines which DPF is operating (i.e., to which DPF the exhaust gas is directed) from the position of the switching valve 9. If the DPF 10*a*, for example, is operating at step 201, the ECU 30 further determines whether the amount of $SO_x$ absorbed in the DPF 10*a* has increased to a predetermined value based on the value of a $SO_x$ counter CSA at step 203. CSA is a counter representing the amount of $SO_x$ absorbed in the DPF 10*a* and the value thereof is set by the operation in FIG. 4 which will be explained later. If the value of CSA reaches a predetermined value $CS_0$ at step 203, i.e., if the amount of $SO_x$ absorbed in the operating DPF 10*a* has increased to a predetermined value, the ECU 30 switches the switching valve 9 to the position where all the exhaust gas is directed to the other DPF 10*b* at step 205. In this case, the ECU 30 further supplies electricity to the DPF 10*a* to raise the temperature of the DPF 10*a* to above a predetermined temperature (about 500° C. and preferably 600° C.) and supplies reducing agent to the DPF 10*a* from the reducing agent supply unit 12. Thus, the DPF 10*a* is isolated from the exhaust gas flow and exposed to a high temperature in a lean air-fuel ratio atmosphere and, thereby, the absorbed $SO_x$ is released from the DPF 10a. This $SO_x$ recovery operation is continued for a predetermined period at step 209. The period for continuing the $SO_x$ recovery operation is a period sufficient for releasing the amount of the absorbed $SO_x$ (i.e., the amount corresponding to the value $CS_0$ of the $SO_x$ counter) and determined by experiment. After performing the $SO_x$ recovery operation for the predetermined period, the ECU 30 clears the value of the $SO_x$ counter CSA at step 211. After clearing the value of the $SO_x$ counter, the ECU 30 further determines whether the regenerating operation of the DPF 10a is required at step 213. Namely, at step 213, the ECU 30 determines whether the amount of the particulate matter trapped in the DPF 10a has reached a predetermined value by comparing the value of a particulate counter CPA with a predetermined value $CP_0$. Particulate counter CPA is a counter representing the amount of particulate matter trapped in the DPF 10a, and the value thereof is set by the operation in FIG. 4. If the amount of the particulate has reached to the predetermined value (i.e., if $CPA \geq CP_0$ at step 313), since it is determined that the regenerating operation of the DPF 10a is necessary, the ECU 30 supplies secondary air to the DPF 10a from the nozzle 13a of the secondary air supply unit 13 at step 215. The amount of secondary air and the amount of the reducing agent supplied to the DPF 10a is set in such a manner that the temperature of the DPF 10a does not become excessively high (for example, less than 800° C.). At step 217, this regenerating operation of the DPF 10 is continued for a predetermined period. The period for continuing the regenerating operation is a period sufficient for burning the amount of the trapped particulate matter (i.e., the amount corresponding to the value $CP_0$ of the particulate counter) and determined by experiment. When the predetermined period has elapsed at step 217, the ECU 30 stops the supply of the reducing agent and secondary air as well as the supply of the electricity to the DPF 10a at step 218, and clears the value of the particulate counter CSA at step 219. Thus, the regenerating operation of the DPF 10a is completed. The DPF 10a is kept in this condition and isolated from the exhaust gas until the switching valve 9 is switched to the position where the exhaust gas is directed to the DPF 10a. If $CPA<CP_0$ at step 213, since this means that the regenerating operation of the DPF 10a is not necessary, the ECU 30 immediately stops the supply of the reducing agent and electricity to the DPF 10a.

If $CSA<CS_0$ at step 203, i.e., if the $SO_x$ recovery operation of the DPF 10a is not required, the ECU 30 executes step 223 to determine whether the $NO_x$ releasing operation of the DPF 10a is required. At step 223, it is determined whether the value of a $NO_x$ counter CNA has increased to a predetermined value $CN_0$. The $NO_x$ counter CNA represents the amount of $NO_x$ absorbed in the DPF 10a, and is set by the operation in FIG. 4. If $CNA \geq CN_0$ at step 223, since this means that the $NO_x$ releasing operation of the DPF 10a is required, the ECU 30 isolates the DPF 10a from the exhaust gas by switching the switching valve 9 to the position where the exhaust gas is directed to the DPF 10b at step 225, and supplies the reducing agent to the DPF 10a from the nozzle 12a of the reducing agent supply unit 12 at step 227. Thus, the DPF 10a is exposed to a relatively low temperature and a rich air-fuel ratio atmosphere to perform the $NO_x$ releasing operation. At step 227, the $NO_x$ releasing operation is continued for a predetermined period. The period for continuing the $NO_x$ releasing operation is a period required for releasing the amount of $NO_x$ absorbed in the DPF 10a (the amount corresponding to the value $CN_0$ of the counter CNA), and determined by experiment. When the predetermined period elapsed, the ECU 30 stops the supply of the reducing agent at step 230, and clears the value of the $NO_x$ counter CNA of the DPF 10a at step 231. When the $NO_x$ releasing operation of the DPF 10a is completed, the DPF 10a is reserved in this condition until the switching valve 9a is switched to the position where the exhaust gas is directed to the DPF 10a.

If $CNA<CN_0$ at step 223, i.e., if the $NO_x$ releasing operation of the DPF 10a is not necessary, the ECU 30 immediately stops the operation, and the $NO_x$ absorption and the collection of the particulate matter by the DPF 10a is continued.

If the DPF 10b is operating at step 201, the operations exactly the same as those explained above are performed for DPF 10b at steps 233 through 261 in FIG. 3. Since steps 233 through 261 in FIG. 3 are the same as steps 203 through 231 in FIG. 2, the detailed explanation is omitted. CSB, CPB and CNB in steps 233, 243 and 253 are the $SO_x$ counter, the particulate counter and the $NO_x$ counter of the DPF 10b.

Figure 4:
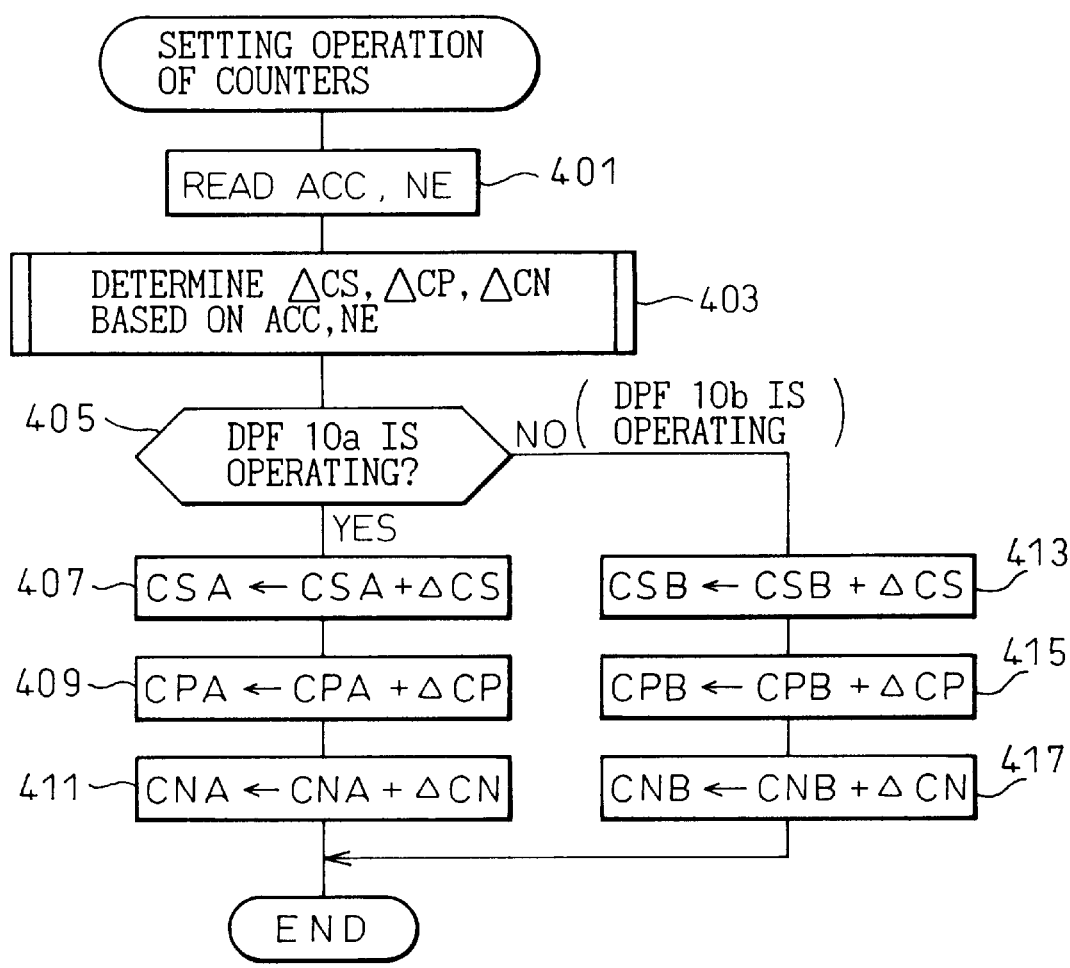
FIG. 4 is a flowchart illustrating the setting operation of the values of the counters used in the flowchart in FIGS. 2 and 3.

FIG. 4 is a flowchart explaining the setting operation of the $SO_x$ counters (CSA, CSB), the particulate counters (CPA, CPB) and the $NO_x$ counters (CNA, CNB) used in the operation in FIGS. 2 and 3. This operation is performed by a routine executed by the ECU 30 at predetermined intervals. In this operation, the ECU 30 increases the values of the respective counters by the amounts determined by the operating condition of the engine. As explained before, the values of the $SO_x$ counters, the particulate counters and the $NO_x$ counters represent the amounts of $SO_x$, particulate and $NO_x$ absorbed or trapped in the respective DPF.

First, the amount of $SO_x$ absorbed in the DPF is considered. It is considered that the amount of $SO_x$ absorbed by the DPF per unit time is proportional to the amount of $SO_x$ produced by the engine per unit time. Since the amount of $SO_x$ produced by the engine per unit time is determined by the engine load (i.e., the amount of fuel burned in the engine per unit time), the amount of $SO_x$ absorbed by the DPF per unit time is determined by the engine load. In this embodiment, the amounts of $SO_x$ absorbed by the DPF per unit time (the time corresponding to the interval for performing the operation in FIG. 4) at various engine load (such as the value of the accelerator signal and the engine speed) are previously obtained, for example, by experiment, and stored in the ROM in the ECU 30 as a form of a numerical table using the value of the accelerator signal and the engine speed. In this operation, the ECU 30 calculates the amount of $SO_x$ absorbed by the DPF during the period since the operation was last performed based on the value of the accelerator signal and the engine speed using this numerical map, and increases the value of the $SO_x$ counter by the calculated amount. By this operation, the value of the $SO_x$ counter represents the accumulated amount of $SO_x$ absorbed in the DPF, i.e. the amount of $SO_x$ held in the DPF.

Similarly to $SO_x$, the amount of $NO_x$ absorbed in the DPF per unit time and the amount of particulate trapped by the DPF per unit time are determined by the engine load condition. In this embodiment, the amount of $NO_x$ and the particulate absorbed or trapped in the DPF per unit time, at the various engine loads, are previously obtained, by experiment, and stored in the ROM of the ECU 30 as numerical tables similar to that of $SO_x$. In this operation the ECU 30 also calculates the amounts of $NO_x$ and particulate absorbed or trapped by the DPF during the period since the operation was last performed, and increases the value of the $NO_x$ counter and the particulate counter by the calculated amounts. Thus, the values of the $NO_x$ counter and the particulate counter represent the amount of $NO_x$ and particulate, respectively, held in the DPF.

In FIG. 4, at step 401, the value of the accelerator signal ACC and the engine speed NE are read from the corresponding sensors. At step 403, the values of $\Delta CS$, $\Delta CP$ and $\Delta CN$ are calculated from the numerical tables stored in the ROM using the values of the accelerator signal and the engine speed. $\Delta CP$ represents the amount of particulate trapped by the DPF since the operation was last performed, and $\Delta CS$ and $\Delta CN$ represent the amounts of $SO_x$ and $NO_x$ absorbed by the DPF, respectively, since the operation was last performed.

At step 405, the ECU 30 determines which of the DPFs is now operating and, if the DPF 10a is operating, increases the $SO_x$ counter CSA, the particulate counter CPA and the $NO_x$ counter CNA of the DPF 10a at steps 407 through 411 by the amounts $\Delta CS$, $\Delta CP$ and $\Delta CN$, respectively. If the DPF 10b is operating at step 405, the counters CSB, CPB and CNB are increased by the amounts $\Delta CS$, $\Delta CP$ and $\Delta CN$ at steps 413 through 417, respectively. Therefore, by the operation in FIG. 4, the counters of the DPF 10a and 10b represent the amounts of $SO_x$ particulate and $NO_x$ absorbed or trapped in the respective DPF. As explained in FIGS. 2 and 3, the values of the $SO_x$ counters, the particulate counters and the $NO_x$ counters of the DPF 10a and 10b are cleared when the $SO_x$ recovery operation, the regenerating operation and the $NO_x$ releasing operation of the respective DPF is completed.

Next, another embodiment of the present invention is explained.

Figure 5:
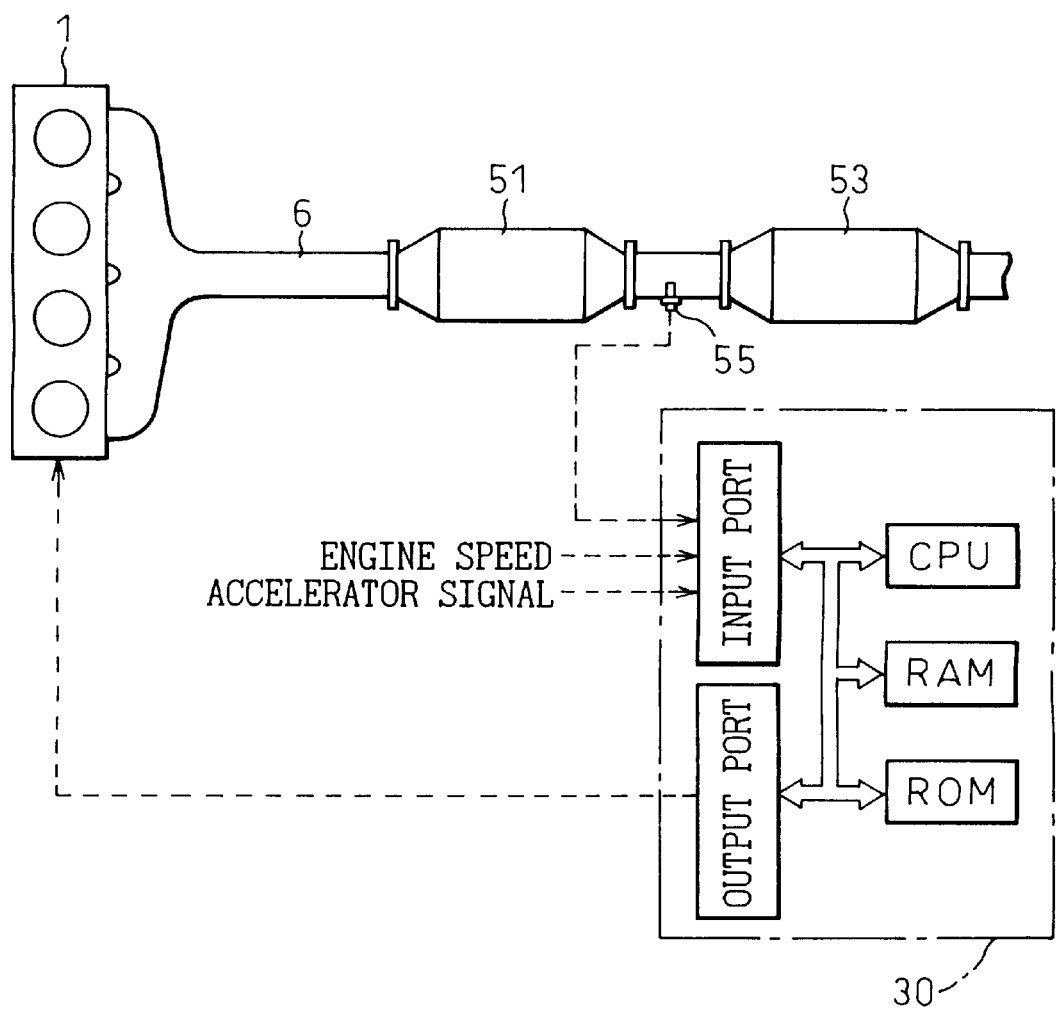
FIG. 5 schematically illustrates another embodiment of the exhaust gas purification device according to the present invention.

FIG. 5 illustrates the general configuration of another embodiment of the present invention. In FIG. 5, reference numerals same as those in FIG. 1 designate the elements same as in FIG. 1.

A diesel engine for an automobile is also used for the engine 1 in this embodiment. However, branch exhaust gas passages 6a and 6b are not provided to the exhaust gas passage 6 of the engine 1, and a three-way catalyst (or an oxidizing catalyst) 51 and a $NO_x$ absorbent 53 are disposed in the exhaust gas passage 6 in this order from the upstream side. Further, an exhaust gas temperature sensor 55 is disposed in the exhaust gas passage 6 at the inlet of the $NO_x$ absorbent 53, and supply a voltage signal corresponding to the temperature of the exhaust gas flowing into the $NO_x$ absorbent 53. In this embodiment, the reducing agent supply unit 12 and nozzles 12a and 12b are not provided.

The three-way catalyst 51 in this embodiment uses a honeycomb substrate made of a material such as cordierite, and a thin coat of alumina is applied on the surface of the substrate. Catalytic components of precious metals, such as platinum (Pt), Palladium (Pd) or rhodium (Rh) are attached to the alumina coat. The three-way catalyst 51 oxidizes SOF (soluble organic fractions), as well as HC and CO in the exhaust gas when the air-fuel ratio of the exhaust gas is lean. When an oxidizing catalyst which uses oxidizing catalytic components such as platinum (Pt) is used in lieu of the three-way catalyst, the oxidizing ability for SOF and HC, CO can be obtained.

The $NO_x$ absorbent 53 in this embodiment uses, for example, a honeycomb type substrate made of cordierite. On this substrate, an alumina layer which acts as a carrier of the catalytic components is applied. On this carrier, precious metals such as platinum (Pt) rhodium (Rh), and at least one substance selected from alkali metals such as potassium (K), sodium (Na), lithium (Li) and cesium (Cs); alkali-earth metals such as barium (Ba) and calcium (Ca); and rare-earth metals such as lanthanum (La) and yttrium (Y) is carried. The $NO_x$ absorbent 53 performs absorbing and releasing operation of $NO_x$ the same as that of the $NO_x$ absorbent in the embodiment in FIG. 1.

As explained before, since a relatively large amount of SOF is contained in the exhaust gas of the diesel engine 1, the three-way catalyst 51 tends to suffer SOF-deterioration during the operation of the engine. Therefore, in order to resume the catalytic ability, the SOF recovery operation, in which the SOF attached to the surface of the catalyst is burned at a high temperature in a lean air-fuel ratio atmosphere, must be performed periodically. However, since the $NO_x$ absorbent 53 is disposed in the exhaust gas passage 6 downstream of the three-way catalyst 51, the growth of the sulfate particles may occur when a lean air-fuel ratio exhaust gas at a high temperature flows through the $NO_x$ absorbent 53 during the SOF recovery operation of the three-way catalyst 51. Therefore, also in this embodiment, the $SO_x$ recovery operation of the $NO_x$ absorbent 53 is performed always before the SOF recovery operation in order to release $SO_x$ in the $NO_x$ absorbent 53 before a lean air-fuel ratio exhaust gas at a high temperature flows into the $NO_x$ absorbent 53.

Further, though the exhaust gas temperature of the diesel engine 1 is generally low, the exhaust gas temperature sometimes becomes high depending on the engine operating condition (the engine load). Therefore, in some cases, a high temperature and lean air-fuel ratio exhaust gas may flow through the $NO_x$ absorbent 53 depending on the operating condition of the engine 1 even if the SOF recovery operation is not performed. In this case, the growth of the sulfate particles in the $NO_x$ absorbent 53 occurs irrespective of the SOF recovery operation of the three-way catalyst 51.

In this embodiment, therefore, the $SO_x$ recovery operation is performed in accordance with the exhaust gas temperature in addition to the $SO_x$ recovery operations similar to that in the previous embodiment. Namely, the ECU 30 monitors the amount of $SO_x$ absorbed in the $NO_x$ absorbent, and performs the $SO_x$ recovery operation when the amount of the absorbed $SO_x$ reaches a predetermined amount. Further, the ECU 30 monitors the exhaust gas temperature TE, and performs the $SO_x$ recovery operation when the temperature TE reaches a predetermined temperature $TE_0$ even though the amount of $SO_x$ absorbed in the $NO_x$ absorbent 53 is lower than the predetermined amount. The temperature $TE_0$ is set at a temperature lower than a growth temperature at which the growth of the sulfate particles due to sintering occurs. By releasing $SO_x$ in the $NO_x$ absorbent 53 at the predetermined temperature $TE_0$, the growth of the sulfate particles in the $NO_x$ absorbent 53 does not occur even if the exhaust gas temperature rises to the growth temperature.

In this embodiment, since the reducing agent supply unit 12 in the previous embodiment is not provided, the $SO_x$ recovery operation is performed by injecting fuel into the cylinders of the engine 1 during the expansion stroke or the exhaust stroke of the respective cylinders in addition to the normal fuel injection during the compression stroke. When fuel is injected into the cylinder during the expansion stroke or the exhaust stroke, the injected fuel vaporizes in the cylinder without burning and is discharged from the cylinder with the exhaust gas. Therefore, when the additional fuel injection is performed during the expansion or exhaust stroke, the amount of HC (unburned fuel) largely increases. Further, since the fuel injected during the expansion or exhaust stroke does not burn in the cylinder, the maximum cylinder pressure and the output torque of the cylinder do not increase. Therefore, a relatively large amount of fuel can be injected into the cylinder during the expansion or exhaust stroke without causing a lower reliability of the engine resulting from the increased maximum cylinder pressure, or a change in the output torque of the engine. Thus, by the fuel injection during the expansion or exhaust strokes of the cylinders (hereinafter referred to as "the expansion stroke fuel injection"), it is possible to supply a rich air-fuel ratio exhaust gas to the $NO_x$ absorbent 53.

When the expansion stroke fuel injection is performed at the engine 1, the exhaust gas containing a relatively large amount of unburned fuel flows through the three-way catalyst 51 disposed upstream, and the unburned fuel in the exhaust gas is oxidized at the three-way catalyst 51. By this oxidation of the unburned fuel, the oxygen concentration in the exhaust gas is lowered and, at the same time, the temperature of the exhaust gas rises. Therefore, a high temperature and a rich air-fuel ratio exhaust gas flows into the $NO_x$ absorbent 53 downstream of the three-way catalyst 51, and the $SO_x$ recovery operation of the $NO_x$ absorbent 53 is performed by this high temperature and rich air-fuel ratio exhaust gas.

The $SO_x$ recovery operation of the $NO_x$ absorbent 53 is continued for a period required for releasing all $SO_x$ absorbed in the $NO_x$ absorbent 53 and, when all $SO_x$ in the $NO_x$ absorbent 53 is released, the amount of the expansion stroke fuel injection is decreased to the amount which makes the air-fuel ratio of the exhaust gas lean. When the air-fuel ratio of the exhaust gas flowing through the three-way catalyst becomes lean, since a sufficient amount of oxygen is supplied to the three-way catalyst 51, the temperature of the three-way catalyst 51 increases due to the oxidation of the unburned fuel in the exhaust gas. Due to this high temperature and lean air-fuel ratio atmosphere, the SOF attached to the surface of the catalyst burns, and the SOF recovery operation of the three-way catalyst is performed.

In this condition, although a high temperature and lean air-fuel ratio exhaust gas flows through the $NO_x$ absorbent 53 downstream of the three-way catalyst 51, the growth of the sulfate particles in the $NO_x$ absorbent 53 does not occur since all of $SO_x$ in the $NO_x$ absorbent 53 was released before the SOF recovery operation of the three-way catalyst 51 started.

Figure 6:
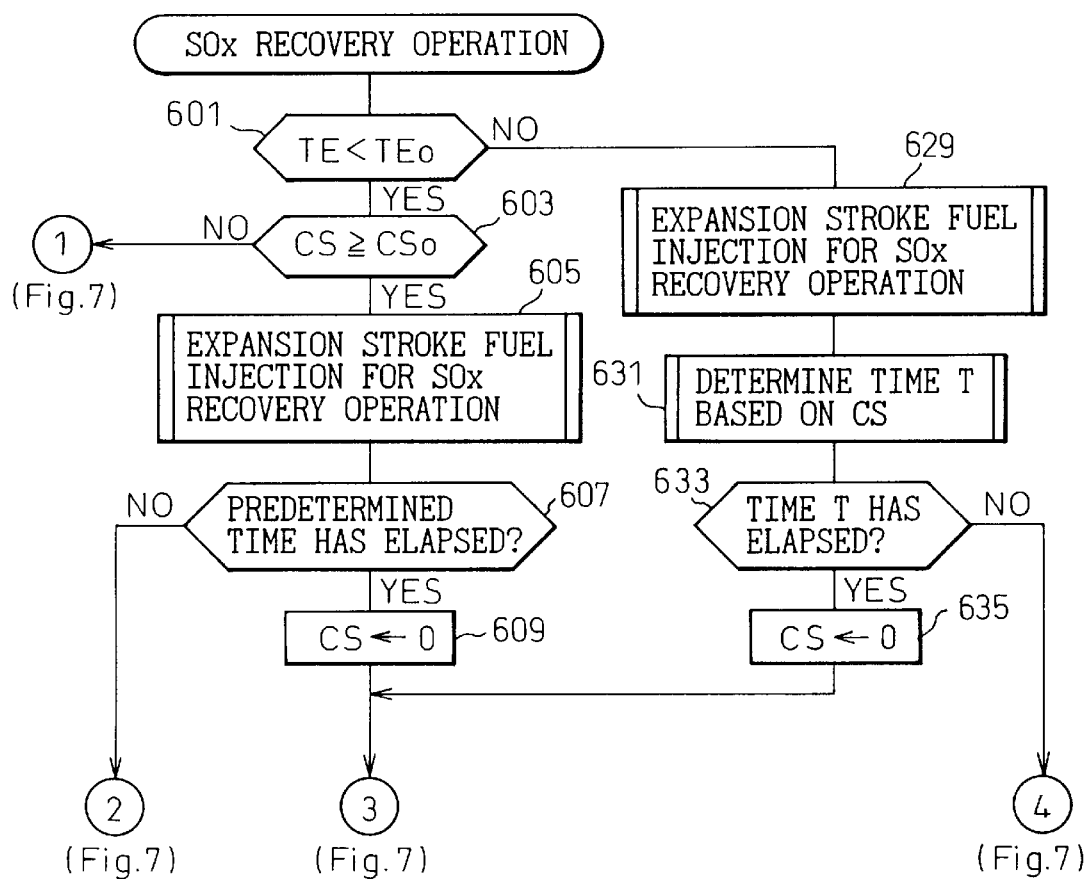
FIGS. 6 and 7 show a flowchart illustrating the $SO_x$ recovery operation of the device in FIG. 5.
Figure 7:
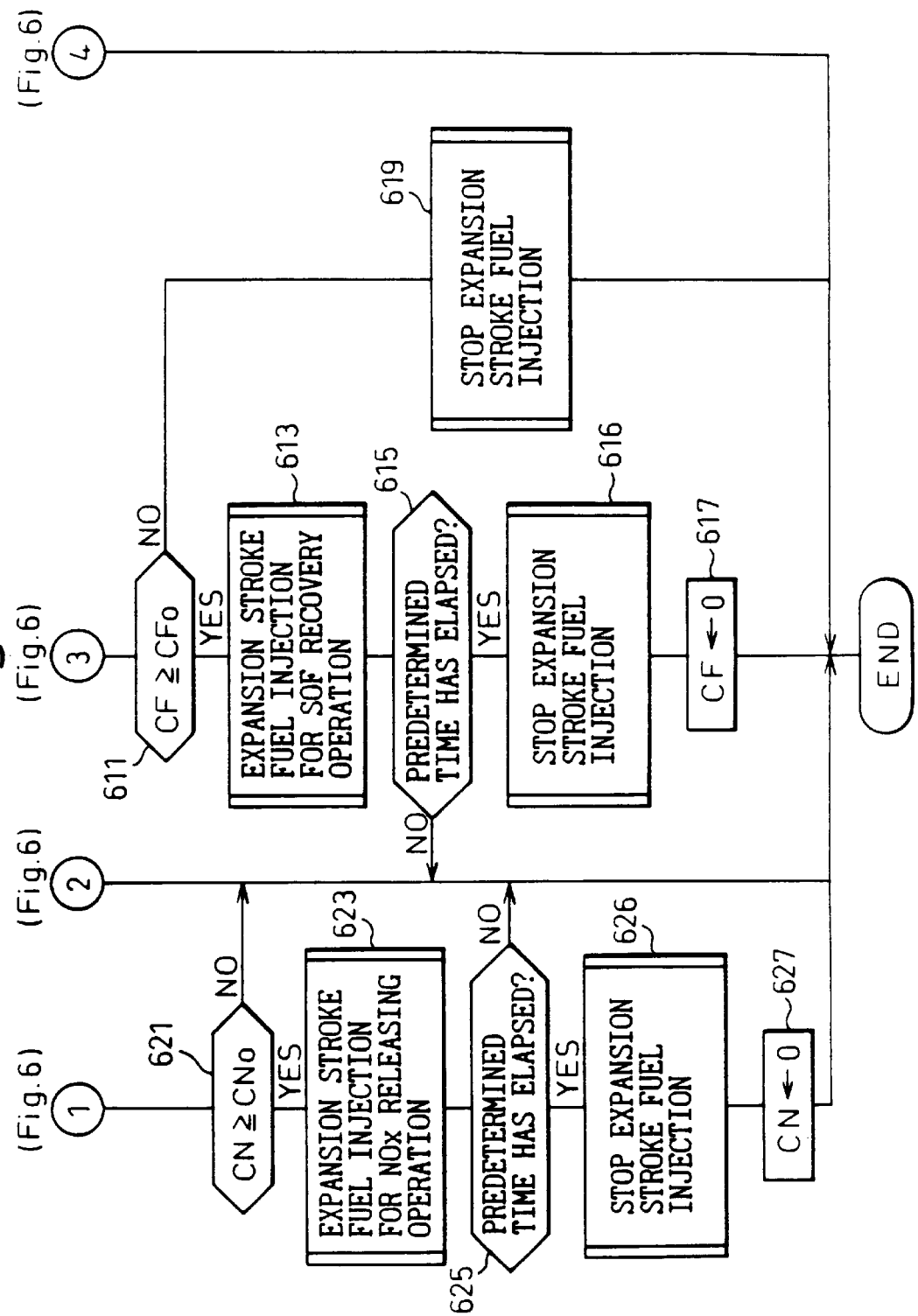

In FIGS. 6 and 7 are a flowchart explaining the $SO_x$ recovery operation of this embodiment. This operation is performed by a routine executed by the ECU 30 at predetermined timings.

FIG. 6, at step 601, the ECU 30 reads the exhaust gas temperature TE at the inlet of the $NO_x$ absorbent 53 from the exhaust gas temperature sensor 55 and compares it with a predetermined temperature $TE_0$. If $TE<TE_0$ at step 603, the ECU 30 determines whether the value of the $SO_x$ counter CS has reached a predetermined value $CS_0$, i.e., whether the amount of $SO_x$ absorbed in the $NO_x$ absorbent 53 is larger than a predetermined value. The $SO_x$ counter CS is a counter similar to CSA, CSB in FIGS. 2 and 3 and represents the amounts of $SO_x$ absorbed in the $NO_x$ absorbent 53. The value of the $SO_x$ counter is set by the operation in FIG. 8. If $CS \geq CS_0$ at step 603, i.e., if the amount of $SO_x$ absorbed in the $NO_x$ absorbent 53 is larger than the predetermined amount, the ECU 30 immediately performs an $SO_x$ recovery operation at steps 605 through 609. Namely, the expansion stroke fuel injection of the engine 1 is performed at step 605 to supply exhaust gas containing a large amount of unburned fuel to the three-way catalyst 51 upstream of the $NO_x$ absorbent 53. The temperature of the exhaust gas flowing through the three-way catalyst 51 becomes high due to the oxidation of fuel on the three-way catalyst, and a high temperature and rich air-fuel ratio exhaust gas flows into the $NO_x$ absorbent 53 downstream of the three-way catalyst 51. Thus, the absorbed $SO_x$ is released from the $NO_x$ absorbent 53. This $SO_x$ recovery operation is continued until a predetermined time elapses at step 607. The predetermined time at step 607 is a time sufficient for releasing all the absorbed $SO_x$ (the amount corresponding to $CS_0$) from the $NO_x$ absorbent 51, and is determined by experiment. The amount of the expansion stroke fuel injection is determined in such a manner that the air-fuel ratio of the exhaust gas flowing through the $NO_x$ absorbent 53 becomes a rich air-fuel ratio sufficient to release $SO_x$ from the $NO_x$ absorbent 53.

When the predetermined time has elapsed at step 607, i.e., when the $SO_x$ recovery operation is completed, the value of the $SO_x$ counter CS is cleared at step 609.

In this embodiment, an electric heater may be provided on the $NO_x$ absorbent 53. If the electric heater is provided, the heater is activated at step 605 to further raise the temperature of the $NO_x$ absorbent 53 in order to complete the $SO_x$ recovery operation in a short time.

Steps 611 through 617 represent the SOF recovery operation of the three-way catalyst 51. The SOF recovery operation is performed after the completion of the $SO_x$ recovery operation of the $NO_x$ absorbent 53, also in this embodiment. At step 611, the ECU 30 determines whether the value of the SOF counter CF has reached a predetermined value $CF_0$. The SOF counter CF is a counter representing the amount of SOF attached to the three-way catalyst 51, and is set by the operation in FIG. 8. If $CF \geq CF_0$ at step 611, i.e., if the amount of $SO_x$ attached to the three-way catalyst 51 is larger than a predetermined amount, the amount of the expansion stroke fuel injection is reduced to an amount which makes the air-fuel ratio of the exhaust gas flowing into the three-way catalyst lean. When the amount of the expansion fuel injection is reduced, although the temperature of the three-way catalyst 51 is maintained at a high temperature due to the oxidation of the unburned fuel, the air-fuel ratio of the exhaust gas flowing through the three-way catalyst becomes lean. Thus, the three-way catalyst 51 is exposed to a lean air-fuel ratio atmosphere at a high temperature, and the SOF attached to the three-way catalyst burns. The high temperature lean air-fuel ratio exhaust gas from the three-way catalyst 51 flows into the $NO_x$ absorbent 53. However, since $SO_x$ absorbed in the $NO_x$ absorbent 53 was already released by the $SO_x$ recovery operation at steps 605 through 609, the growth of the sulfate particles does not occur.

The SOF recovery operation is performed by the expansion stroke fuel injection until the predetermined time elapses at step 615. The predetermined time at step 615 is a time sufficient for burning all the amount of SOF attached to the three-way catalyst 51 (the amount corresponding to $CF_0$), and determined by experiment.

When the predetermined time has elapsed at step 615, the additional expansion stroke fuel injection is terminated at step 616, and the value of the SOF counter CF is cleared at step 617. Thus, the SOF recovery operation is completed.

If $CF<CF_0$ at step 611, since the amount of SOF attached to the three-way catalyst is small and the SOF-deterioration is not occurred, the expansion stroke fuel injection is terminated at step 619, i.e., the SOF recovery operation is not performed in this case.

If the amount of $SO_x$ absorbed in the $NO_x$ absorbent 53 has not reached to the predetermined amount at step 603, the ECU 30 executes step 621 in FIG. 7 to determine whether the $NO_x$ releasing operation of the $NO_x$ absorbent 53 is required. Namely, at step 621, the ECU 30 determines whether the value of the $NO_x$ counter CN has reached to a predetermined value $CN_0$. If $CN \geq CN_0$, since this means that the amount of $NO_x$ absorbed in the $NO_x$ absorbent 53 is large, the ECU 30 performs the $NO_x$ releasing operation at steps 623 through 627. At step 623, the expansion stroke fuel injection is performed to supply a rich air-fuel ratio exhaust gas to the $NO_x$ absorbent 53. Since the temperature of the exhaust gas required for the $NO_x$ releasing operation of the $NO_x$ absorbent is lower than the temperature required for the $SO_x$ recovery operation, the amount of the expansion stroke fuel injection during the $NO_x$ releasing operation is smaller than that during the $SO_x$ recovery operation, and is set at an amount sufficient for maintaining the air-fuel ratio of the exhaust gas flowing into the $NO_x$ absorbent 51 rich. The expansion stroke fuel injection is continued until a predetermined time elapses at step 625. The predetermined time in step 625 is a time sufficient for releasing the amount of $NO_x$ corresponding to CNO from the $NO_x$ absorbent 53, and determined by experiment. When the predetermined time has elapsed at step 625, the expansion stroke fuel injection is terminated at step 626, and the value of the $NO_x$ counter CN is cleared at step 627. Thus, the $NO_x$ releasing operation of the $NO_x$ absorbent 53 is completed.

Steps 629 through 633 represent the $SO_x$ recovery operation performed for preventing the growth of the sulfate particles when the exhaust gas temperature rises due to the operating condition of the engine. Since the temperature $TE_0$ is a temperature slightly lower than the growth temperature where the sulfate particles in the $NO_x$ absorbent grow in a lean air-fuel ratio atmosphere, if the exhaust gas temperature TE at the inlet of the $NO_x$ absorbent increases to $TE_0$ at step 601, the exhaust gas temperature may further increases to the growth temperature. Therefore, in this case, it is necessary to release all $SO_x$ absorbed in the $NO_x$ absorbent 53 before the exhaust gas temperature reaches the growth temperature, in order to prevent the growth of the sulfate particles. Therefore, if $TE \geq TE_0$ at step 601, the ECU 30 executes step 629 in FIG. 6 to perform the $SO_x$ recovery operation and carries out the expansion stroke fuel injection irrespective of the amount of $SO_x$ absorbed in the $NO_x$ absorbent 53. At step 631, the ECU 30 determines the time T required for releasing all the amount of $SO_x$ from the $NO_x$ absorbent 53 based on the value of the $NO_x$ counter CS. The time T required for continuing the $SO_x$ recovery operation varies in accordance with the amount of $SO_x$ absorbed in the $NO_x$ absorbent. In this embodiment, the relationship between the amount of $SO_x$ absorbed in the $NO_x$ absorbent and the time T required for releasing all $SO_x$ absorbed in the $NO_x$ absorbent is previously obtained by experiment, and the required time T is stored in the ROM of ECU 30 as a function of the value of $NO_x$ counter CS. At step 631, the time T required for continuing the $SO_x$ recovery operation is determined from the value of the $SO_x$ counter CS based on the relationship stored in the ROM. At step 633, the $SO_x$ recovery operation is continued until the time T determined at step 631 elapses. When the required time T has elapsed at step 633, the value of the $SO_x$ counter CS is cleared, and the ECU 30 executes step 611 in FIG. 7 and performs, if necessary, the SOF recovery operation of the three-way catalyst 51.

Though the respective recovery operations are achieved by the expansion stroke fuel injection in this embodiment, a reducing agent supply unit similar to that in FIG. 1 may be provided to supply reducing agent to the exhaust gas passage upstream of the three-way catalyst 51. In this case, reducing agent (diesel fuel) is supplied to the exhaust gas passage 6 upstream of the three-way catalyst 51 at steps 605, 613, 623 and 629 instead of performing the expansion stroke fuel injection.

Figure 8:
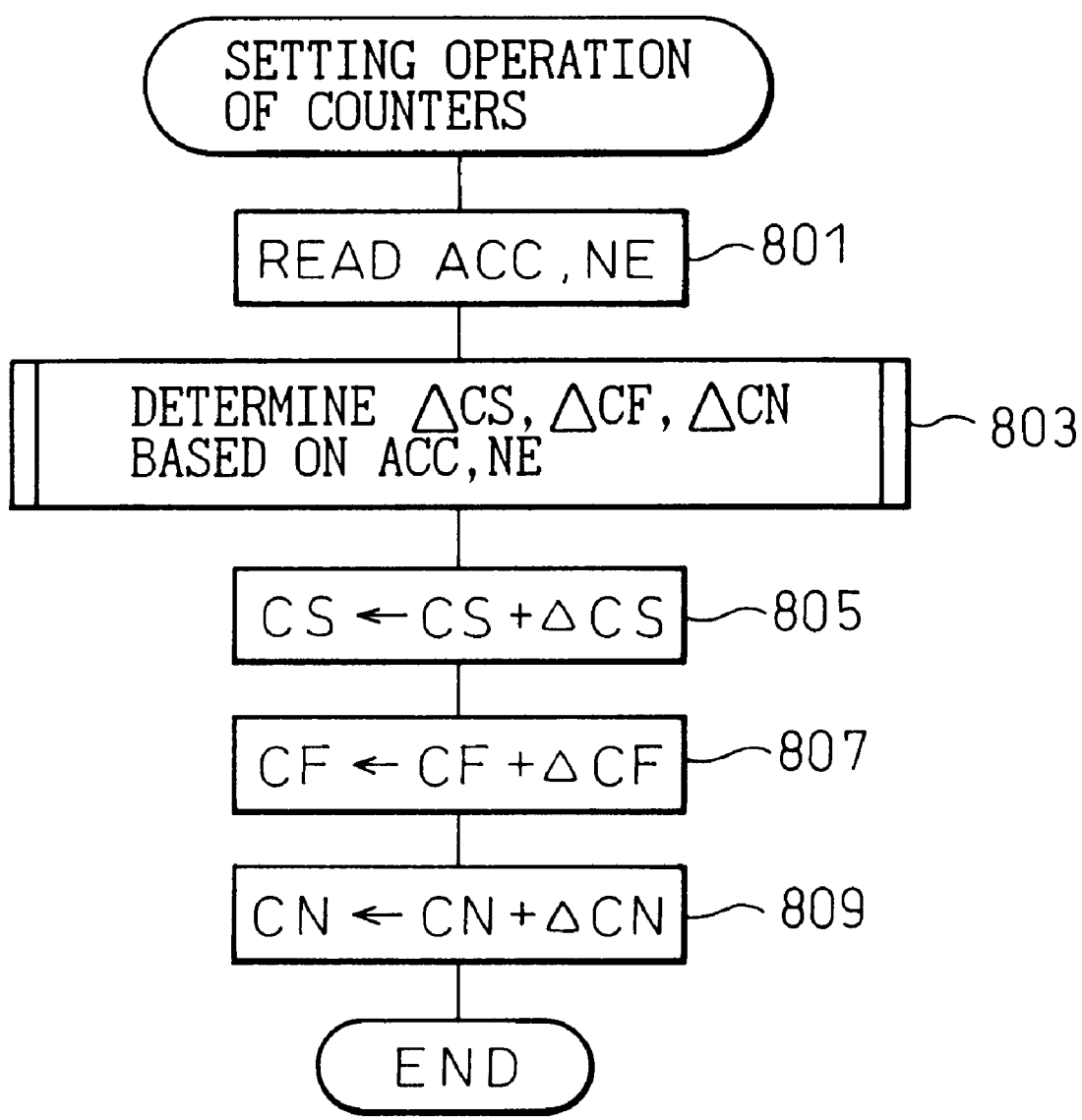
FIG. 8 is a flowchart illustrating the setting operation of the values of the counters used in the flowchart in FIGS. 6 and 7.

FIG. 8 shows a flowchart explaining the setting operation of the counters CS, CF and CN used in the operation in FIGS. 6 and 7. In this operation, the values of the counters CS and CN are set by the manner same as that in FIG. 4. Namely, the amounts of $SO_x$ and $NO_x$ absorbed in the $NO_x$ absorbent ($\Delta CS$ and $\Delta CN$) per unit time are determined from the engine load (ACC) and the engine speed (NE) based on the numerical tables stored in the ROM (step 803) and the value of the counters CS and CN are set at the accumulated values of $\Delta CS$ and $\Delta CN$, respectively (steps 805 and 809). Further, in this embodiment, the amount of SOF attached to the three-way catalyst per unit time $\Delta CF$ is obtained previously at various engine load and speeds, by experiment, and stored in the ROM of the ECU 30 as a form of a numerical table similar to those for $SO_x$ and $NO_x$. The amount of SOF attached to the three-way catalyst per unit time $\Delta CF$ is determined from the engine load (ACC) and the engine speed (NE) (step 803) and the value of the SOF counter CF is set at the accumulated value of $\Delta CF$ (step 807).

Figure 9:
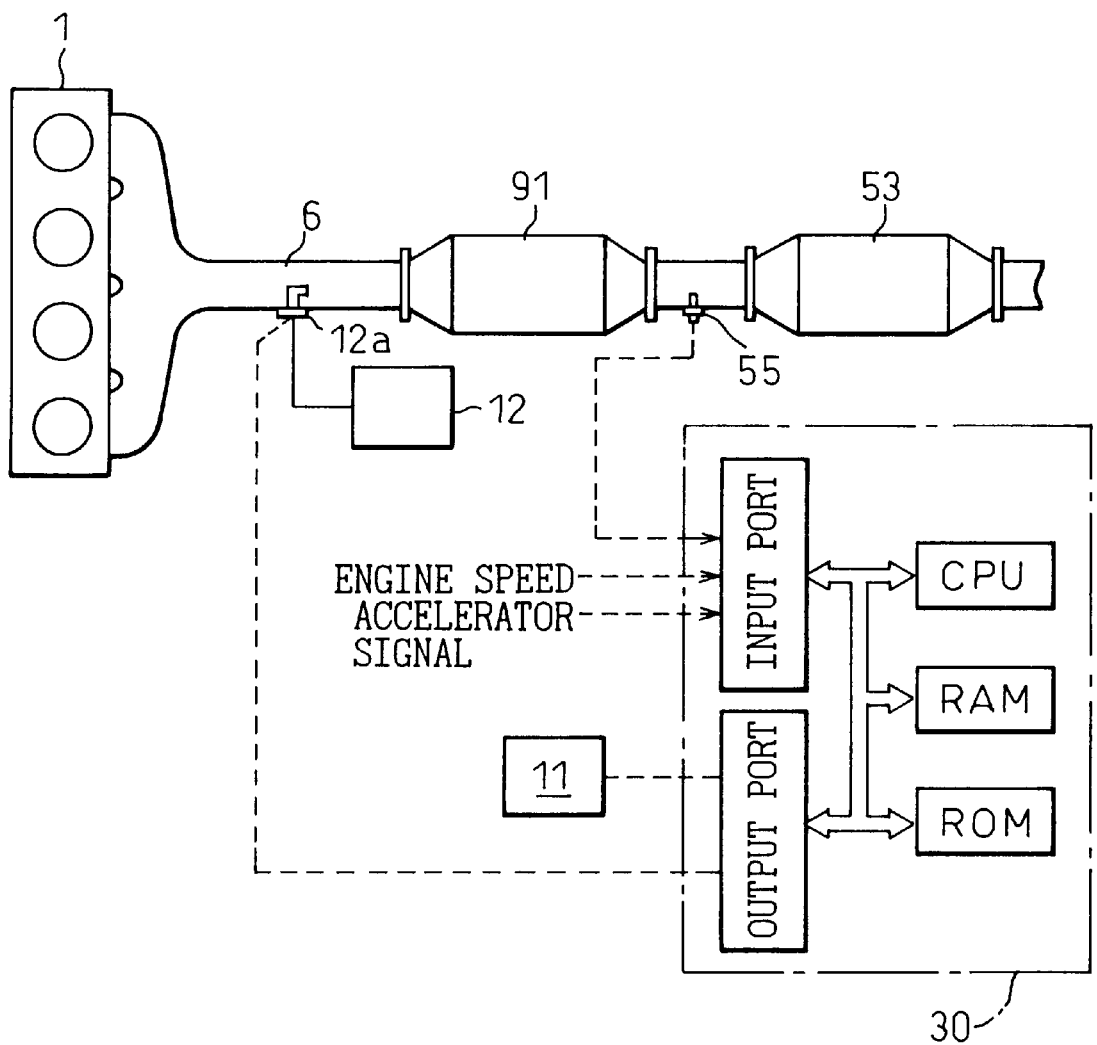
FIGS. 9 and 10 are drawings schematically illustrating other embodiments of the exhaust gas purification device according to the present invention.
Figure 10:
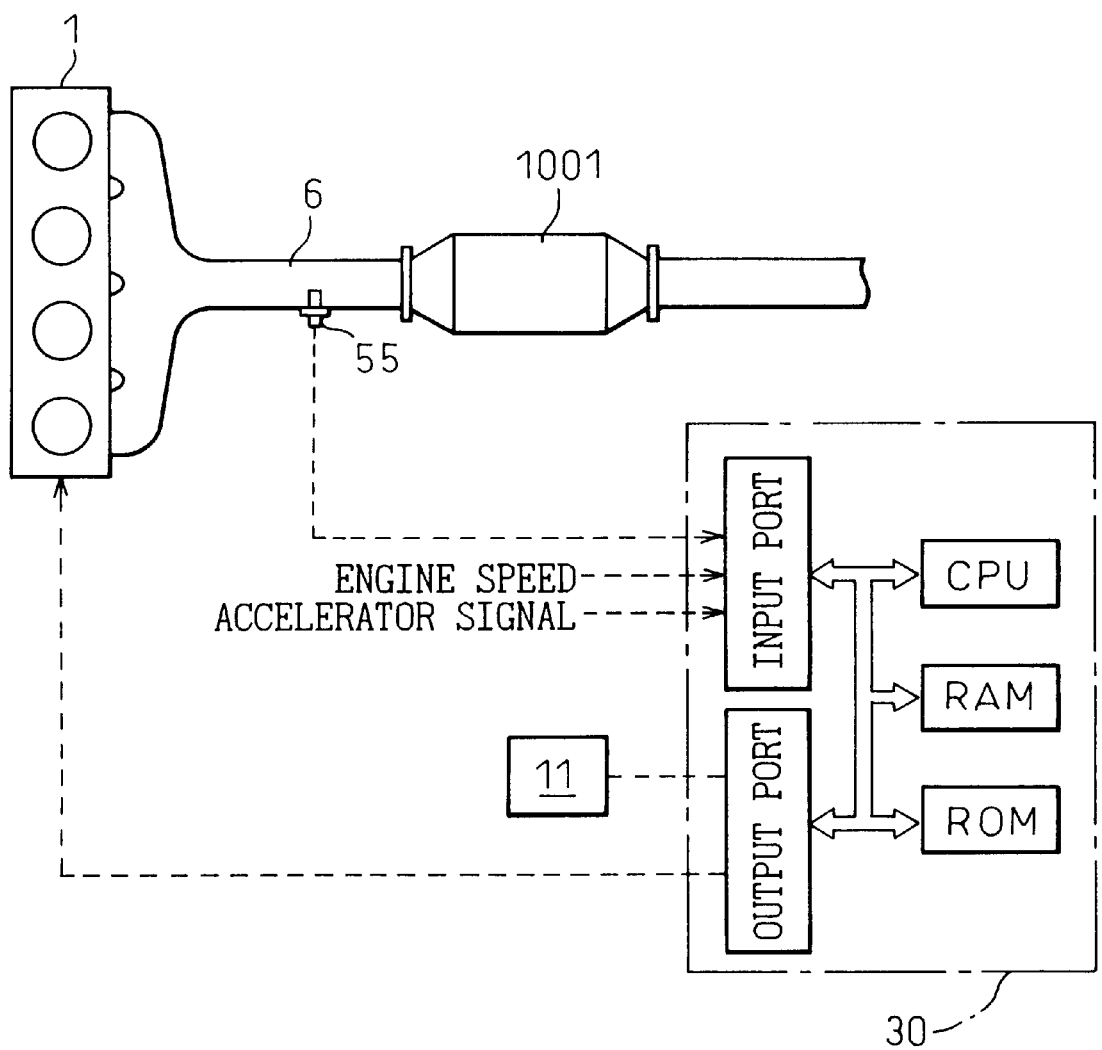

FIGS. 9 and 10 illustrate general configurations of other embodiments of the present invention. In FIGS. 9 and 10, reference numerals same as those in FIGS. 1 and 5 designate the same elements.

FIG. 9 shows the case where the three-way catalyst 51 in FIG. 5 is replaced by a DPF 91. The DPF 91 has a construction similar to that of the DPF 10*a* and 10*b* in FIG. 1, except that $NO_x$ absorbent is not attached to the wall surfaces of the exhaust gas paths in the DPF 91. Further, in FIG. 9, the reducing agent supply unit 12 are the nozzle 12*a* are provided for supplying reducing agent to the exhaust gas passage 6 upstream of the DPF 91. However, also in this embodiment, it is possible to perform the respective recovery operations by the expansion stroke fuel injection without providing the reducing agent supply unit 12. The DPF 91 and the $NO_x$ absorbent 53 in this embodiment use metal substrates similar to those in FIG. 1, which act as electric heaters. Therefore, the DPF 91 and the $NO_x$ absorbent 53 can be heated during the regenerating operation of the DPF 91 and the $SO_x$ recovery operation of the $NO_x$ absorbent 53 when the exhaust gas temperature is low.

In this embodiment, the ECU 30 monitors the amount of $SO_x$ absorbed in the $NO_x$ absorbent 53 by the $SO_x$ counter similar to the previous embodiments and, when the amount of $SO_x$ increases, the ECU 30 performs the $SO_x$ recovery operation by supplying reducing agent from the unit 12 to the exhaust gas and by heating the $NO_x$ absorbent 53 by supplying electricity to the substrate thereof. Further, the ECU monitors the amount of particulate trapped in the DPF 91 by the particulate counter similar to the previous embodiments and, if the amount of particulate increases, performs the regenerating operation after completing the $SO_x$ recovery operation of the $NO_x$ absorbent as explained above. The $SO_x$ recovery operation is also performed in the manner similar to that in the embodiment of FIGS. 6 and 7 when the exhaust gas temperature increases to the predetermined temperature $TE_0$ to prevent the growth of the sulfate particles in the $NO_x$ absorbent 53.

FIG. 10 shows the case where the DPF 91 and the $NO_x$ absorbent 53 in FIG. 9 are combined. Similarly to the DPF 10*a* and 10*b* in FIG. 1, the DPF 1001 in this embodiment carries the $NO_x$ absorbent and acts as both the particulate filter and the $NO_x$ absorbent. In this embodiment, the respective recovery operations are performed by the expansion stroke fuel injection, and the reducing agent supply unit 12 in FIG. 9 is not provided. The $SO_x$ recovery operation, the $NO_x$ releasing operation and the regenerating operation of DPF 1001 is the same as the operation in the embodiment of FIG. 9, and a detailed explanation is omitted.

Though the embodiments show the cases where a diesel engine is used as an internal combustion engine, this invention also can be applied to an other type of internal combustion engine, such as a gasoline engine, which can be operated at a lean air-fuel ratio.

We claim:

1. An exhaust gas purification device for an engine comprising:
    a $NO_x$ absorbent disposed in an exhaust gas passage of an internal combustion engine, wherein said $NO_x$ absorbent absorbs $NO_x$ in the exhaust gas of the engine when the air-fuel ratio of the exhaust gas is at a lean air-fuel ratio and releases the absorbed $NO_x$ when the oxygen concentration in the exhaust gas is lowered, and wherein said $NO_x$ absorbent absorbs $SO_x$ in the exhaust gas when the air-fuel ratio of the exhaust gas is at a lean air-fuel ratio and releases the absorbed $SO_x$ when the oxygen concentration in the exhaust gas is lowered and when the temperature of the $NO_x$ absorbent is higher than a $SO_x$ releasing temperature;
    $SO_x$ releasing means for raising the temperature of the $NO_x$ absorbent to a temperature higher than the $SO_x$ releasing temperature and for lowering the oxygen concentration of the exhaust gas flowing into the $NO_x$ absorbent to, thereby, release the absorbed $SO_x$ from the $NO_x$ absorbent; and
    $SO_x$ control means for controlling the amount of $SO_x$ absorbed in the $NO_x$ absorbent by controlling the $SO_x$ releasing means in such a manner that, when it is expected that the temperature of the $NO_x$ absorbent increases to a first predetermined temperature when the air-fuel ratio of the exhaust gas is lean, substantially all of the absorbed $SO_x$ is released from the $NO_x$ absorbent by the $SO_x$ releasing means before the temperature of the $NO_x$ absorbent reaches said first predetermined temp.

2. An exhaust gas purification device as set forth in claim 1, wherein said $NO_x$ absorbent holds the absorbed $SO_x$ therein in the form of a particle of sulfate, and wherein said first predetermined temperature is a temperature at which the sulfate particles in the $NO_x$ absorbent starts to grow in a lean air-fuel ratio exhaust gas.

3. An exhaust gas purification device as set forth in claim 1, wherein said $SO_x$ control means further comprises an exhaust gas temperature detecting means for detecting the temperature of the exhaust gas flowing into the $NO_x$ absorbent and activates the $SO_x$ releasing means when the temperature of the exhaust gas increases to a second predetermined temperature which is lower than the first predetermined temperature.

4. An exhaust gas purification device as set forth in claim 1, further comprising:
    purifying means disposed in the exhaust gas passage upstream of the $NO_x$ absorbent for removing a specific component contained in the exhaust gas; and
    burning means for burning the specific component trapped by or attached to the purifying means by raising the temperature of the purifying means and by supplying a lean air-fuel ratio exhaust gas to the purifying means,
    wherein said $SO_x$ controlling means activates the $SO_x$ releasing means before activating the burning means.

5. An exhaust gas purification device as set forth in claim 4, wherein said specific component is a soluble organic fraction, and said purifying means is an oxidizing catalyst or three-way catalyst which oxidizes the soluble organic fraction in the exhaust gas.

6. An exhaust gas purification device as set forth in claim 4, wherein said specific component is particulate matter in the exhaust gas, and said purifying means is a particulate filter which traps the particulate matter in the exhaust gas.

* * * * *